Patented Oct. 16, 1945

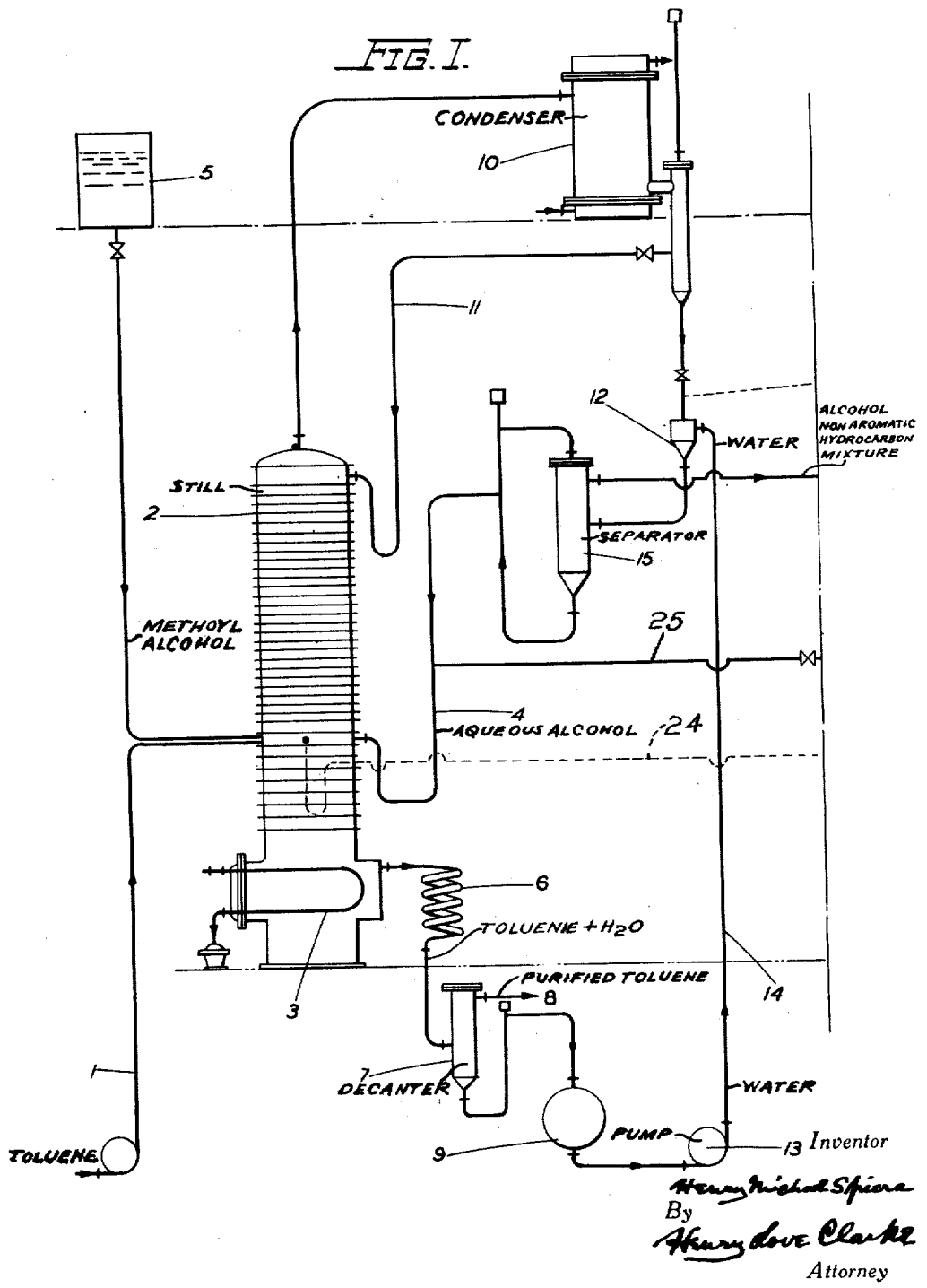

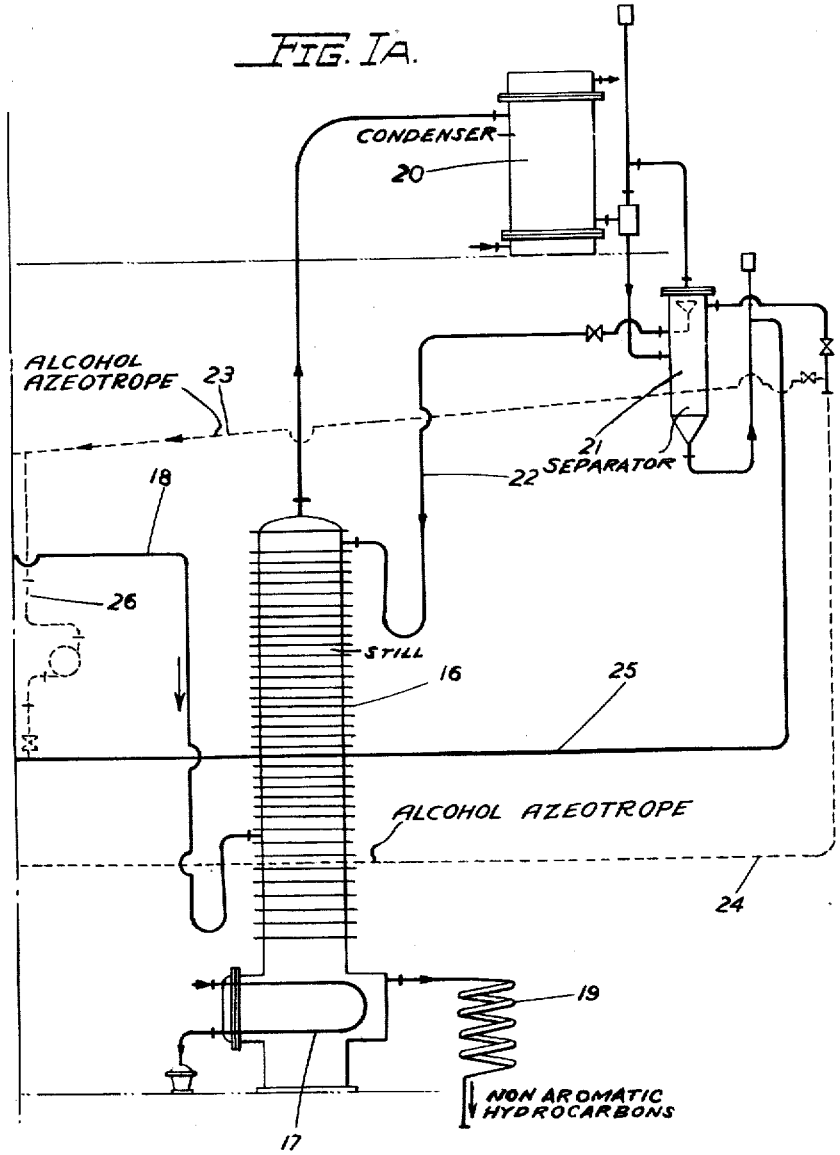

2,386,755

UNITED STATES PATENT OFFICE 2,386,755

PURIFICATION OF HYDROCARBONS BY AZEOTROPIC DISTILLATION

Henry Michael Spiers, Guildford, England, assignor to Woodall-Duckham (1920) Limited, Guildford, England, a British company Application February 17, 1943, Serial No. 476,176
In Great Britain February 23, 1942

6 Claims. (Cl. 202—42)

This invention relates to the removal of undesired components from mixtures of liquid hydrocarbons by means of an azeotropic distillation process involving distillation of the mixture with an entraining agent, for the purpose of separating the undesired and the desired components.

The invention is applicable to distillation processes in which the entraining agent is an aliphatic alcohol containing not more than three carbon atoms in the molecule, i. e. methyl, ethyl, propyl or isopropyl alcohol.

In the provisional specification of the prior British Patent No. 536,172, a process is described in which the entraining agent (for example, methyl alcohol) is removed from the undesired hydrocarbons which it brings over during the distillation process by extraction with water, and the aqueous alcohol is then concentrated by rectification to remove the water before re-use of the alcohol for the treatment of a further quantity of raw material.

The present invention enables the concentration or rectification of the entraining agent to be dispensed with, thus facilitating the large-scale use of the azeotropic distillation method of purification, and simplifying the plant necessary for the operation.

According to the present invention, in a process for the removal of non-aromatic hydrocarbons from a mixture of hydrocarbons containing an aromatic hydrocarbon having a boiling point below 150° C. by distillation with an entraining agent comprising an aliphatic alcohol containing not more than three carbon atoms in the molecule, the alcohol is separated from the azeotropic distillate containing it and the undesired components, by the addition thereto of the smallest possible amount of water (not exceeding 20% by volume of the amount of alcohol present in the azeotrope) necessary to separate the bulk of the hydrocarbons, the aqueous alcohol is separated, and is re-used as such for the treatment of a further quantity of the raw material to be purified.

The invention further comprises a continuous process for the separation of undesired components from a mixture of hydrocarbons containing an aromatic hydrocarbon having a boiling point below 150° C. by distillation with an entraining agent for the said undesired components consisting of an aliphatic alcohol containing not more than three carbon atoms in the molecule, characterized by the features that the alcohol is separated from the azeotropic distillate containing it and the undesired components by the addition thereto of the smallest possible amount of water necessary to separate the bulk of the hydrocarbons, the aqueous alcohol is separated, and is returned to the distillation column at or closely adjacent to the point of entry to the column of the raw material to be purified.

When operating with methyl alcohol in the manner described in the preceding paragraph, on a raw material containing an aromatic hydrocarbon (such, for example, as toluene) which it is desired to separate from accompanying non-aromatic hydrocarbons which have boiling points up to about 150° C. higher than that of the aromatic hydrocarbon, it will be found that the water introduced into the fractionating column with the returned alcohol is eliminated from the bottom of the column with the purified aromatic hydrocarbon. According to a further feature of the present invention, this water is separated from the aromatic hydrocarbon and is re-used for the treatment of the azeotrope to separate the alcohol therefrom as described above. Under these conditions, it does not matter if a little alcohol is allowed to pass out with the bottoms.

The non-aromatic hydrocarbon components eliminated from the azeotrope by treatment with water will contain a small quantity of alcohol, and may be further treated in a fractionating column to remove, as an azeotrope, the alcohol contained therein, and this azeotropic mixture which is rich in alcohol may according to the present invention either be added to the main body of distillate from the first column which is to be treated with the limited amount of water, or may be returned direct to the column for admixture with the raw material.

It will be appreciated that the alcohol chosen for the purification of a particular aromatic hydrocarbon will be one which does not form a ternary azeotrope with water and any of the hydrocarbons present.

Suitable apparatus for carrying out the process of the present invention is illustrated in Figures 1 and 1a of the accompanying drawings. The raw material containing the hydrocarbon (e. g. toluene) from which the undesired non-aromatic hydrocarbon components are to be eliminated, is pumped through the pipe 1 into the primary fractionating column 2, comprising a lower stripping section and an upper rectifying section. The base of the column 2 contains a heating coil 3. The entraining agent (for example, aqueous methyl alcohol), recovered as hereafter described from the separated undesired components, is returned to the column 2 by the pipe 4, and any make-up alcohol required in the circuit is supplied from tank 5.

The aqueous methyl alcohol and the impure raw material are fed to the column 2 through either the same, or through closely adjacent inlets; in the case of a plate column, the alcohol and hydrocarbons are fed on to a feed plate adapted to give good mixing of the two components. Plates adapted for dealing with a two-phase mixture may be employed in the stripping section of the column. Alternatively, the column 2 may be filled with contact bodies such as rings.

The undesired non-aromatic hydrocarbon components are removed by the methyl alcohol, and purified toluene and water are withdrawn at the base of the column 2 through the cooler 6; the water is separated in the decanter 7, from which the toluene is removed at 8, while the water passes to the tank 9 for re-use in the process. The undesired components with the methyl alcohol are removed in vapour form as an azeotropic distillate from the top of column 2 and are condensed in condenser 10; a portion of the condensate is returned as reflux through the pipe 11 to the top of the column.

The remainder of the distillate passes to the washer 12, to which water from tank 9 is supplied by the pump 13 and pipe 14. The amount of water supplied to washer 12 is the minimum amount necessary to separate the bulk of the hydrocarbons from the methyl alcohol, and should not exceed about 20% by volume of the amount of alcohol present in the condensate. The liquids are separated in decanter 15, from which the aqueous methyl alcohol is returned to the column 2 through pipe 4 as already described.

The hydrocarbon impurities eliminated in washer 12 and decanter 15 will still contain a small amount of alcohol. This alcohol may be recovered in a secondary fractionating column 16. This column also comprises lower stripping and upper rectifying sections, with a heating coil 17 in the base. The separated hydrocarbons from column 2 are fed to column 16 through pipe 18. The alcohol is removed in this column, and the hydrocarbon residue free from alcohol is withdrawn from the base of the column through cooler 19. The alcohol and some of the hydrocarbons pass off from the top of column 16 as an azeotropic distillate rich in alcohol. This distillate is condensed in condenser 20, and flows to the decanter 21, from which a part is returned as reflux through pipe 22 to the top of column 16. The remainder of the condensate is either passed through pipe 23 and added to the main body of distillate from column 2, or alternatively is returned through pipe 24 direct to the column 2 for admixture with the raw material. If any aqueous alcohol separates in decanter 21, this can also be returned direct to column 2 through pipe 25, or alternatively can be pumped through the pipe 26 and added to the main body of condensate from column 2.

The quantity of alcohol introduced with the raw material is adjusted so that the amount suffices to bring over the non-aromatic hydrocarbons with boiling points up to about 15° C. higher than the boiling point of the aromatic hydrocarbon in question. When the raw material is an impure toluene and methyl alcohol is used as the entraining agent, the azeotropic distillate in the primary column 2 contains alcohol and non-aromatic hydrocarbons in a ratio of somewhat less than 2:1 by volume, e. g. about 1.7:1.

The purified hydrocarbon collected at 8 in column 2 can be submitted, if necessary, to any final purification steps such as washing and a final rectification.

The process of the present invention may be operated either as a batch or as a continuous process. For batch purification, the columns 2 and 16 are replaced by two columns mounted on suitable stills. The charge to the first still will consist of the hydrocarbon mixture to be purified and aqueous alcohol. Water and purified aromatic hydrocarbon will form the still residue, while the distillate will be the azeotrope. The latter is separated in a washer by the addition of a limited amount of water as already described, into its hydrocarbons (plus a little alcohol) and aqueous alcohol, the latter being used for the treatment of a further batch of raw material. In the second still, the small amount of alcohol present in the azeotrope hydrocarbons is removed as an azeotropic distillate which is returned to the washer while a residue of substantially non-aromatic hydrocarbons remains in the still.

The following example shows how effective is the use of aqueous methyl alcohol in the purification of a low-gravity nitration toluole whereby the specific gravity is raised to a value even higher than is stipulated in the standard specifications of the National Benzole Association. The raw material was a low-gravity nitration toluole which had the following characteristics:

Specific gravity at 15.5° C_____ 0.8526
Distillation range:
  5/95% _____°C__ 0.70
  5/97% _____°C__ 0.75

The actual toluene content of the sample was therefore approximately 86.5% by volume. 750 ml. of the sample were fractionated with a mixture of 350 ml. of methyl alcohol and 70 ml. of water. The column consisted of a 25 mm. tube packed to a length of 48" with single-turn glass helices having an internal diameter of 3 mm. and was provided with a reflux return system. The column was worked just short of the flooding point. Distillate was collected at the rate of 50 ml. per hour until 350 ml. of distillate had been taken over and then at 25 ml. per hour. The early fractions were washed with water to recover the hydrocarbons contained in them. The last fraction and the residue were separated from water by means of a separating funnel. The results were as follows:

| Fraction | Range, °C. | Vol., ml. | Hydrocarbons cumulative | | | |
|---|---|---|---|---|---|---|
| | | | Vol., ml. | Sp. gr. | Vol. | Sp. gr. |
| 1 | 59.5–61.3 | 50 | 21 | 0.7501 | 21 | 0.7501 |
| 2 | 61.3–61.9 | 50 | 20 | 0.7349 | 41 | 0.7427 |
| 3 | 61.9–62.3 | 50 | 18 | 0.7444 | 59 | 0.7432 |
| 4 | 62.3–62.5 | 50 | 17.5 | 0.7571 | 76.5 | 0.7464 |
| 5 | 62.5–63.2 | 50 | 16.5 | 0.7836 | 93 | 0.7530 |
| 6 | 63.2–63.3 | 50 | 15.5 | 0.7961 | 108.5 | 0.7592 |
| 7 | 63.3 | 50 | 13.5 | 0.8329 | 122 | 0.7674 |
| 8 | 63.3–63.4 | 50 | 13.5 | 0.8372 | 135.5 | 0.7744 |
| 9 | 63.4–63.5 | 50 | 13 | 0.8477 | 148.5 | 0.7810 |
| 10 | 63.5–63.7 | 50 | 13 | 0.8561 | 161.5 | 0.7870 |
| 11 | 63.7–74.3 | 50 | 18.5 | 0.8690 | 180 | 0.7955 |
| 12 | 74.3–83.0 | 12 | 6.5 | 0.8695 | 186.5 | 0.7981 |
| 13 | Residue | 585 | 557 | 0.8699 | 743.5 | 0.8519 |
| | Loss | 23 | 6.5 | | | |
| | | 1,170 | 750 | | | |

The loss consisted largely of water held up in the packing at the close of the distillation.

The results show that a toluole with a very high specific gravity, 0.8699, was obtained by azeotropic treatment of the sample with methyl alcohol to which 20% by volume of water had been added.

582 ml. of product (fractions 11–13) were recovered with a specific gravity exceeding 0.8698, this representing 77.6% by volume of the sample or nearly 88% of the toluene contained therein.

What I claim is:

1. A continuous process for the separation of undesired non-aromatic hydrocarbons from a raw material mixture containing non-aromatic hydrocarbons together with aromatic hydrocarbons boiling below 150° C., comprising feeding the hydrocarbon mixture with a 2-component azeotropic distillation agent consisting of an aliphatic alcohol containing not more than three carbon atoms in the molecule and water into a fractionating column having a stripping section and a rectifying section, withdrawing purified aromatic hydrocarbon and water from the stripping section, decanting the mixture to separate the aromatic hydrocarbon from the water distilling overhead from the rectifying section a distillate comprising the non-aromatic hydrocarbons and the alcohol, adding the recovered water to the distillate to effect a separation of the non-aromatic hydrocarbon from the alcohol, separating the non-aromatic hydrocarbon and the aqueous alcohol, distilling the non-aromatic hydrocarbon to separate alcohol therefrom and returning the alcohol to the fractionating column at a point closely adjacent the place of entry of raw material to the column, the quantity of water maintained in circulation in the circuit being not greater than the amount necessary to cause a separation of the bulk of non-aromatic hydrocarbons from the distillate.

2. The process as defined in claim 1 in which the water does not exceed (20%) percent by volume of the amount of alcohol present in the azeotrope.

3. The process as defined in claim 2 in which the non-aromatic hydrocarbons separated from the primary distillate by treatment with water are fractionated in a second column to separate a distillate containing alcohol with a small amount of hydrocarbons contained therein, and returning this distillate to the main body of distillate being separated overhead in the first column at a point ahead of the treatment of the distillate with water.

4. The process as defined in claim 3 in which the non-aromatic hydrocarbons separated from the primary distillate recovered overhead from the first column by treatment with water are fractionated in a second column to separate a distillate containing a mixture of alcohol with a small amount of hydrocarbons contained therein, and returning this hydrocarbon-alcohol distillate directly to the first column for admixture with the raw material being fed to the column.

5. The process as defined in claim 4 in which the non-aromatic hydrocarbon separated from the primary distillate by treatment with water is fractionated in a second column to take overhead an alcohol containing non-aromatic hydrocarbon distillate and to recover a residue of non-aromatic hydrocarbons, decanting the distillate to separate alcohol and returning the alcohol to the main column for admixture with the raw material supplied to the column.

6. The process as defined in claim 5 in which the non-aromatic hydrocarbons separated from the primary distillate by treatment with water are fractionated in a second column to take overhead an alcohol distillate containing hydrocarbons and to recover a residue of non-aromatic hydrocarbons decanting the distillate to separate alcohol and adding the alcohol to the main distillate from the first column before it is diluted with water.

HENRY MICHAEL SPIERS.

CERTIFICATE OF CORRECTION.

Patent No. 2,386,755.   October 16, 1945.

HENRY MICHAEL SPIERS.

It is hereby certified that error appears in the printed specification of the above numbered patent requiring correction as follows: Page 3, second column, line 1, claim 3, for the claim reference numeral "2" read --1--; line 11, claim 4, for "3" read --1--; line 21, claim 5, for "4" read --1--; line 31, claim 6, for "5" read --1--; and that the said Letters Patent should be read with this correction therein that the same may conform to the record of the case in the Patent Office.

Signed and sealed this 29th day of January, A. D. 1946.

Leslie Frazer (Seal)   First Assistant Commissioner of Patents.

The results show that a toluole with a very high specific gravity, 0.8699, was obtained by azeotropic treatment of the sample with methyl alcohol to which 20% by volume of water had been added.

582 ml. of product (fractions 11-13) were recovered with a specific gravity exceeding 0.8698, this representing 77.6% by volume of the sample or nearly 88% of the toluene contained therein.

What I claim is:

1. A continuous process for the separation of undesired non-aromatic hydrocarbons from a raw material mixture containing non-aromatic hydrocarbons together with aromatic hydrocarbons boiling below 150° C., comprising feeding the hydrocarbon mixture with a 2-component azeotropic distillation agent consisting of an aliphatic alcohol containing not more than three carbon atoms in the molecule and water into a fractionating column having a stripping section and a rectifying section, withdrawing purified aromatic hydrocarbon and water from the stripping section, decanting the mixture to separate the aromatic hydrocarbon from the water distilling overhead from the rectifying section a distillate comprising the non-aromatic hydrocarbons and the alcohol, adding the recovered water to the distillate to effect a separation of the non-aromatic hydrocarbon from the alcohol, separating the non-aromatic hydrocarbon and the aqueous alcohol, distilling the non-aromatic hydrocarbon to separate alcohol therefrom and returning the alcohol to the fractionating column at a point closely adjacent the place of entry of raw material to the column, the quantity of water maintained in circulation in the circuit being not greater than the amount necessary to cause a separation of the bulk of non-aromatic hydrocarbons from the distillate.

2. The process as defined in claim 1 in which the water does not exceed (20%) percent by volume of the amount of alcohol present in the azeotrope.

3. The process as defined in claim 2 in which the non-aromatic hydrocarbons separated from the primary distillate by treatment with water are fractionated in a second column to separate a distillate containing alcohol with a small amount of hydrocarbons contained therein, and returning this distillate to the main body of distillate being separated overhead in the first column at a point ahead of the treatment of the distillate with water.

4. The process as defined in claim 3 in which the non-aromatic hydrocarbons separated from the primary distillate recovered overhead from the first column by treatment with water are fractionated in a second column to separate a distillate containing a mixture of alcohol with a small amount of hydrocarbons contained therein, and returning this hydrocarbon-alcohol distillate directly to the first column for admixture with the raw material being fed to the column.

5. The process as defined in claim 4 in which the non-aromatic hydrocarbon separated from the primary distillate by treatment with water is fractionated in a second column to take overhead an alcohol containing non-aromatic hydrocarbon distillate and to recover a residue of non-aromatic hydrocarbons, decanting the distillate to separate alcohol and returning the alcohol to the main column for admixture with the raw material supplied to the column.

6. The process as defined in claim 5 in which the non-aromatic hydrocarbons separated from the primary distillate by treatment with water are fractionated in a second column to take overhead an alcohol distillate containing hydrocarbons and to recover a residue of non-aromatic hydrocarbons decanting the distillate to separate alcohol and adding the alcohol to the main distillate from the first column before it is diluted with water.

HENRY MICHAEL SPIERS.

---

CERTIFICATE OF CORRECTION.

October 16, 1945.

Patent No. 2,386,755.

HENRY MICHAEL SPIERS.

It is hereby certified that error appears in the printed specification of the above numbered patent requiring correction as follows: Page 3, second column, line 1, claim 3, for the claim reference numeral "2" read --1--; line 11, claim 4, for "3" read --1--; line 21, claim 5, for "4" read --1--; line 31, claim 6, for "5" read --1--; and that the said Letters Patent should be read with this correction therein that the same may conform to the record of the case in the Patent Office.

Signed and sealed this 29th day of January, A. D. 1946.

Leslie Frazer (Seal)

First Assistant Commissioner of Patents.

Certificate of Correction

Patent No. 2,386,755. October 16, 1945.

HENRY MICHAEL SPIERS

It is hereby certified that errors appear in the printed specification of the above numbered patent requiring correction as follows: Page 1, second column, line 13, for "150° C." read *15° C.*; page 2, second column, lines 56 to 60, for that portion of the heading to the table reading

| Hydrocarbons cumulative | | | |
|---|---|---|---|
| Vol., ml. | Sp. gr. | Vol. | Sp. gr. | read

| Hydrocarbons | | | |
|---|---|---|---|
| Vol., ml. | Sp. gr. | Cumulative | |
| | | Vol. | Sp. gr. | and that the said Letters Patent should be read with these corrections therein that the same may conform to the record of the case in the Patent Office.

Signed and sealed this 2d day of July, A. D. 1946.

[SEAL]

LESLIE FRAZER,
*First Assistant Commissioner of Patents.*